June 30, 1970     D. M. HARVEY     3,517,598
SYSTEMS FOR REMOVING A NORMALLY FIXED MASK FROM A LENS APERTURE
Original Filed Jan. 4, 1968

DONALD M. HARVEY
INVENTOR.

ATTORNEYS

United States Patent Office 3,517,598
Patented June 30, 1970

3,517,598
SYSTEMS FOR REMOVING A NORMALLY FIXED MASK FROM A LENS APERTURE
Donald M. Harvey, Webster, N.Y., assignor to Eastman Kodak Company, Rochester, N.Y., a corporation of New Jersey
Continuation of application Ser. No. 695,610, Jan. 4, 1968. This application Oct. 27, 1969, Ser. No. 869,962
Int. Cl. G03b 7/08, 9/02
U.S. Cl. 95—64                                    10 Claims

ABSTRACT OF THE DISCLOSURE

A mask and an aperture in a movable vane cooperate to form the exposure aperture of a camera. During high and medium scene light conditions a conventional photoelectric exposure control system adjusts the position of the vane in response to scene light brightness, thereby regulating the size of the portion of the vane aperture in the light path of the camera. Under certain low scene light conditions, an electrical circuit is completed for driving the vane in a direction for obtaining the maximum exposure aperture. During this movement of the vane, it becomes coupled to the mask and swings the mask out of the camera light path, thereby increasing the size of the exposure aperture.

CROSS-REFERENCE TO RELATED APPLICATION

This is a continuation of application Ser. No. 695,610, filed Jan. 4, 1968, now abandoned.

FIELD OF THE INVENTION

This invention relates to automatic systems for regulating diaphragm apertures in either still or motion picture cameras, and more particularly to a system of this class for obtaining the maximum diaphragm aperture under certain low scene brightness conditions.

DESCRIPTION OF THE PRIOR ART

In exposure control systems for cameras it is well known to use a normally fixed mask in cooperation with a single movable diaphragm vane for substantially centralizing the exposure aperture at most diaphragm settings. While the masked single-vane system is efficient and inexpensive, the mask blocks part of the lens aperture and therefore reduces the maximum usable exposure aperture somewhat, typically one-third to one-half stop.

The Stimson et al. U.S. Pat. 3,083,033 suggests that the mask either be manually or automatically removed from alignment with the taking lens in order to use the full lens aperture at conditions of lowest scene brightness. Manual removal of the mask is objectionable because the camera operator must remember to remove the mask for full aperture. The automatic system disclosed in the Stimson et al. patent is driven by the exposure meter, and this additional load on the exposure meter is undesirable and detracts somewhat from the basic advantage of the masked single-vane system.

The Eagle et al. U.S. Pat. 3,292,517 discloses a movable mask which is spring biased toward a position out of alignment with the taking lens during each actuation of the camera's shutter release mechanism. Interlocking structure between the meter-driven vane and the mask normally holds the mask in alignment with the taking lens but permits the mask to move out of such alignment with the taking lens under low scene light conditions.

SUMMARY OF THE INVENTION

A primary object of the present invention is to automatically remove a mask from the light path in a camera at certain low scene light levels, and to accomplish such removal using an electrical power source which does not impose an additional load on the usual exposure control mechanism.

A further object of the invention is to provide an electrically powered system for removing a mask from the camera light path wherein operation of the system is initiated by the closing of switch contacts under low pressure by an instrument forming part of the exposure control mechanism of the camera, and the provision of such a system which provides for self-latching and comparatively high-pressure engagement between the switch contacts after operation of the system has been initiated.

Another object of the invention is to provide an automatic system for removing a mask from the light path in a camera and for holding the mask in its moved position until the shutter is released irrespective of any change in the intensity of scene light occurring subsequent to the movement of the mask from the light path.

A still further object of the invention is the provision of an electrically operated system of the type described wherein low pressure, high impedance engagement between the switch contacts encountered when the circuit is initially closed is not detrimental to the operation of the system.

Other objects of the invention will appear from the following description of the invention.

In accordance with the invention, an exposure control device for defining the exposure aperture of a camera is operable under the influences of a first source of electrical power established as a function of sensed light intensity and a second source of electrical power electrically coupled to the device. The device comprises a movably mounted diaphragm vane having an aperture aligned with the light path of the camera. Means are provided for moving the vane in a first direction in response to light above a predetermined intensity and for moving the vane in a second direction in response to light below the predetermined intensity. The vane moving means comprise a photoresponsive element for sensing light intensity and for establishing the first source of electrical power as a function of sensed light intensity, a coil that is electrically coupled to the photoresponsive element and is energizable by the first source of electrical power to effect movement of the vane in the first direction, and a circuit for energizing the coil to effect movement of the vane in the second direction. The circuit includes a pair of terminals adapted to be electrically coupled to the second source of electrical power and means for electrically coupling the terminals to the coil when the photoresponsive element senses light below the predetermined intensity. The magnitudes and polarities of the first and second sources of electrical power are such that the vane is energized to be driven in the second direction when the terminals are electrically coupled to the coil. A mask is mounted for movement from a first position in alignment with the light path of the camera to a second position out of alignment with the light path, and means are provided for coupling the vane to the mask in response to energization of the coil by the second source of electrical power to effect movement of the mask to the second position in response to movement of the vane in the second direction.

The invention, and its objects and advantages, will become more apparent in the detailed description of the illustrated embodiments presented below.

BRIEF DESCRIPTION OF THE DRAWING

In the detailed description of the illustrated embodiments of the invention presented below, reference is made to the accompanying drawing, in which.

Corresponding reference characters indicate corresponding parts throughout the several views of the drawings.

DESCRIPTION OF THE ILLUSTRATED EMBODIMENTS

Figure 1:
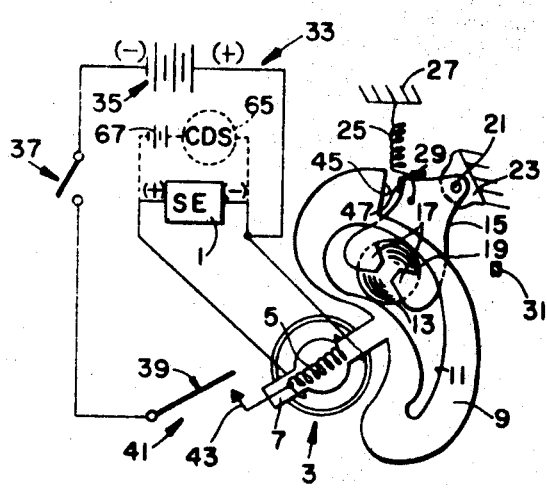
FIG. 1 is a front view of the preferred embodiment of the invention showing the position of the parts at an intermediate scene light level or intensity.

Because certain parts of photographic and related apparatus are well known, the following description is directed in particular to those elements forming, or cooperating directly with, the present invention, elements that are not specifically shown or described herein being understood to be selectable from those known in the art.

THE PREFERRED EMBODIMENT

The systems of the invention may be used either with motion picture cameras or with still cameras. The invention is applicable to those cameras in which automatic exposure control is effected in response to scene light conditions as sensed by light sensitive elements, such as photoelectric cells. Referring to the drawings, conventional exposure controls comprise a photoelectric cell 1 connected in an electric circuit comprising an electrical measuring instrument of the galvanometer type generally designated 3. The instrument comprises a coil 5 of electrical conducting wire carried by a frame 7. The coil is located in a magnetic field so that when the coil is energized it is driven in a counterclockwise direction as viewed in the drawings. The extent of rotation of the coil and the frame is determined by current flow in coil 5 which, in turn, is a function of the intensity or brightness level of the scene light striking photoelectric cell 1. Thus comparatively high levels of light intensity produce relatively great counterclockwise movement of the coil and frame. The coil and frame are biased in a clockwise direction by a spring (not shown) constituting part of the instrument construction.

Conventional exposure control systems further comprise a vane 9 having an elongate teardrop-shaped aperture 11. The vane is carried by the frame 7 and rotates with the coil and frame in accordance with energization of the coil. The light path through the camera is through a lens 13 and the vane aperture in a direction perpendicular to the plane of the drawings. Thus rotation of the vane aligns wider or narrower portions of the vane aperture 11 with the light path for varying the size of the light diaphragm aperture of the camera.

As previously noted, a mask 15 is frequently used in exposure control systems. The mask shown comprises a pair of diametrically opposed mask members 17 at the ends of an arcuate arm 19. The members 17 block light rays from the outer extremities of a portion of the diaphragm aperture. As described in the before-mentioned patents, under conditions of low scene light intensity it is desirable to remove the mask from the light path to obtain a maximum diaphragm opening. The systems of the invention achieve this result electrically without relying solely on the electrical output of the photoelectric cell.

The mask is pivotally mounted at 21 on a suitable support 23 which may comprise part of the camera housing. The mask is biased in a clockwise direction toward its normal position shown in FIG. 1 by a tension spring 25 stretched between the mask and a suitable spring mounting member 27. The spring 25 biases the mask against a stop 29. Movement of the mask in a counterclockwise direction (as described later) is limited by engagement of the mask with a second stop 31.

In accordance with the present invention, the coil and frame of instrument 3 and the vane 9 are driven in a clockwise direction by a second circuit generally designated 33. The second circuit comprises a D.C. power supply shown as a battery 35. The EMF of the battery exceeds the EMF of the photoelectric cell during low scene light conditions. One terminal of the battery is connected directly to one end of coil 5. The other terminal of the battery is connected through a normally open switch 37 to a switch contact 39 of another switch 41. Contact 39 is preferably either a flexible contact or it is pivotally mounted so that it can deflect during operation as described later. Switch 41 further includes a second contact 43 which is shown being carried by an end of the coil frame 7. Contact 43 is connected electrically to the other end of coil 5 for energizing the instrument. As shown in the drawings by the conventional polarity designations, the battery terminals are connected in the circuit to coil 5 so that the polarity of the voltage of the battery is opposite to the polarity of the voltage of the photoelectric cell. Thus, when the coil is energized from the battery the vane is driven in a clockwise direction rather than in a counterclockwise direction as occurs when the coil is energized from the photoelectric cell.

Switch 37 may be manually closed by the operator of the camera. However, in order to achieve desirable automatic operation of the second circuit under low scene light conditions, the switch 37 is preferably coupled to the shutter release mechanism of the camera so that it is closed upon operation of such mechanism by the camera operator.

Figure 2:
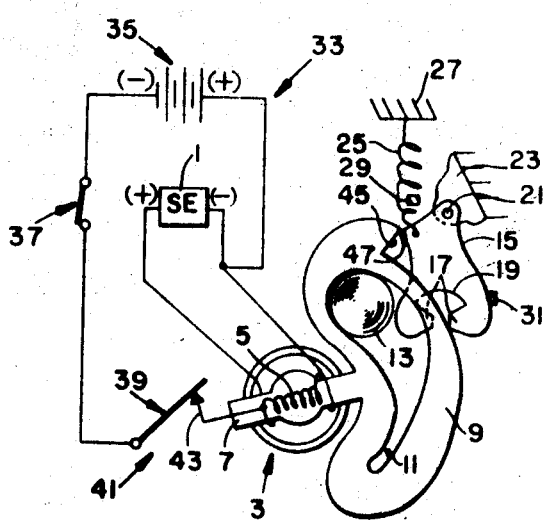
FIG. 2 is a view similar to FIG. 1 showing the parts at maximum opening of the diaphragm aperture.

The purpose of the second circuit 33 is to drive the vane 9 in a direction and with sufficient force to swing the mask 15 from its normal FIG. 1 position to its second or moved position as shown in FIG. 2. This is achieved by providing a shoulder or projection 45 on the vane which is engageable with a finger 47 projecting from the mask into the plane of the vane. Thus, when the vane is driven in a clockwise direction past the point shown in FIG. 1, the shoulder first engages the finger thereby to couple the vane to the mask, and then, on further movement of the vane, the mask is swung from its FIG. 1 to its FIG. 2 position where the mask engages stop 31.

During normal operation of the exposure control system at high and intermediate scene brightness levels, contacts 39 and 43 of switch 41 are spaced from each other to disable circuit 33 so that the exposure is controlled in the usual manner in response to scene brightness as sensed by photoelectric cell 1 with high scene light intensities driving the vane in a counterclockwise direction and with the vane returning in a clockwise direction under spring pressure during lower intensity scene light conditions. When the intensity of the scene light reaches a predetermined low value, the contact 43 moves into engagement with contact 39 thereby completing circuit 33 through coil 5. Because the polarity of the voltage of the battery is opposite to the polarity of the voltage of photoelectric cell 1 and because the EMF of the battery exceeds the EMF of the cell, the instrument is driven by the battery in a clockwise direction. After the coil is energized and while vane 9 moves in the clockwise direction, the shoulder or projection 45 on the vane engages finger 47 and swings the mask 15 to its FIG. 2 position where it is entirely removed from the light path through the camera.

The diaphragm aperture is then at its maximum size as shown in FIG. 2.

Switch contact 39 does not interfere with the rotational movement of the coil frame 7 and contact 43 after engagement between contacts 39 and 43 because contact 39 is either flexible or it is pivotally mounted. The resulting wiping action between the switch contacts helps keep the contacts clean. Moreover, once switch 41 has been closed the second circuit 33 is self-latching, i.e., the driving force of battery 35 will hold contacts 39 and 43 engaged.

Circuit 33 is opened by switch 37 after the camera shutter has been released. When switch 37 has been opened, tension spring 25 swings the mask in a clockwise direction and returns it from its FIG. 2 to its FIG. 1 position. This movement also urges the vane and the instrument coil in a counterclockwise direction. If switch 37 is subsequently closed under very low scene light conditions and while switch 41 is closed, circuit 33 immediately moves the mask to its FIG. 2 position. However, if switch 37 is closed while switch 41 is opened, as occurs during high and intermediate levels of scene light intensity, movement of the vane is under control of photocell 1 in the conventional manner.

AN ALTERNATIVE EMBODIMENT

Figure 3:
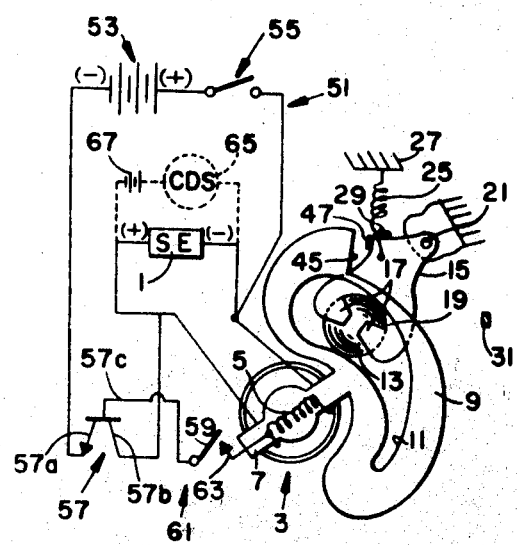
FIG. 3 is a view similar to FIG. 1 showing an alternative embodiment of the invention.

Another embodiment of the invention is illustrated in FIG. 3 of the drawings. The construction of the instrument, vane and mask are the same as those previously described and, accordingly, the same reference numerals have been used to indicate the same parts. In this embodiment, a second circuit 51 is provided for controlling movement of vane 9 under low scene light conditions. Circuit 51 comprises a battery 53 or other source of D.C. power which has its positive terminal connected through a shutter release operated switch 55 to one side of the coil 5. The EMF of the battery exceeds the EMF of the photocell during low scene light conditions. The negative terminal of the battery is connected to the emitter 57a of a transistor 57. The collector 57b of the transistor is connected to the other side of coil 5. Thus, when the transistor is turned on or conducting a circuit path is completed through the transistor from the battery to coil 5 for energizing the instrument. The base 57c of the transistor is connected to a flexible contact 59 of a switch 61. The other contact 63 of the switch 61 is carried by the coil frame 7. Since power and gain are of little significance in the circuit, the transistor selected for use in the circuit can be substantially any positive cut-out transistor.

In operation of the FIG. 3 embodiment, energization of the coil 5 and thus movement of the coil frame 7 and vane 9 are under control of the photoelectric cell 1 during high and intermediate intensity scene light conditions. At predetermined low scene light conditions clockwise movement of the frame 7 closes the switch 61, thereby turning on the transistor. When the transistor has been turned on the circuit is completed from the battery through the transistor to coil 5. Since the polarity of voltage from battery 53 is opposite to the polarity of the voltage from the photoelectric cell 1, the higher EMF of the battery will drive the vane 9 in a clockwise direction for swinging the mask out of the light path in the same manner previously described in connection with FIGS. 1 and 2.

The FIG. 3 embodiment is desirable since very little power is required at base 57c to switch the transistor to a conductive state. Thus there is very little current across switch 61, and this minimizes sparking at the switch contacts as they are opened and closed.

As illustrated in phantom in the drawings, the systems of the invention can be used with light sensitive elements such as a selenium photoelectric element shown at 1, but also with a conventional cadmium sulfide light sensitive element 65 and a mercury battery 67. When the cadmium sulfide cell is used, the mercury battery circuit should be closed prior to the closing of the secondary circuit to allow the instrument to move from its zero or no scene light position thereby avoiding latching of the second circuit prematurely each time the shutter release operated switch is closed.

In the systems of the invention removal of the mask from the camera light path is effected by a separate electric circuit so that no additional load is placed on the conventional exposure control mechanism. In the systems of the invention switches 41 and 61 are self-latching (once engagement between the switch contacts has been established) since pressure between these switch contacts increases after their initial engagement. While the engagement between these switch contacts is a comparatively low pressure, high impedance engagement, this is not a disadvantage in view of the relatively low loads encountered. This is particularly so in the case of the FIG. 3 embodiment since switch 61 is simply used for switching on the transistor and does not carry the main load of the second circuit.

In each embodiment the batteries for the second circuit may be provided solely for the purpose of operating mask removing mechanisms. However, the batteries may also comprise the power supply for electrically powered motion picture cameras, or they may be the batteries used for flash mode of operation of still cameras.

The invention has been described in detail with particular reference to the illustrated preferred and alternative embodiments thereof, but it will be understood that variations and modifications can be effected within the spirit and scope of the invention.

I claim:

1. An exposure control device for defining an exposure aperture in a light path of a camera, said device being operable under the influences of a first source of electrical power established as a function of sensed light intensity and a second source of electrical power electrically coupled to said device, said device comprising:

(a) a movable diaphragm vane having an aperture aligned with the light path;
(b) means for moving said vane in a first direction in response to light above a predetermined intensity and for moving said vane in a second direction in response to light below the predetermined intensity, said means including
  (1) a photoresponsive element for sensing light intensity and for establishing the first source of electrical power as a function of sensed light intensity,
  (2) a coil electrically coupled to said element and energizable by the first source of electrical power to effect movement of said vane in the first direction, and
  (3) a circuit for energizing said coil to effect movement of said vane in the second direction, said circuit including
    (a) a pair of terminals adapted to be electrically coupled to the second source of electrical power and
    (b) means for electrically coupling said terminals to said coil when said element senses light below the predetermined intensity, the magnitudes and polarities of the first and second sources of electrical power being such that said vane is energized to be driven in the second direction when said terminals are electrically coupled to said coil;
(c) a mask movable from a first position in alignment with the light path to a second position out of alignment with the light path; and
(d) means for coupling said vane to said mask in response to energization of said coil by the second source of electrical power to effect movement of said mask to the second position in response to movement of said vane in the second direction.

2. The exposure control device claimed in claim 1 wherein said means for electrically coupling said terminals to said coil includes a pair of switch contacts, one of said contacts being movable by said vane moving means into contact with the other of said contacts when said photoresponsive element senses light below the predetermined intensity.

3. The exposure control device claimed in claim 2 wherein said circuit further includes a transistor having a base electrically coupled to said other contact whereby said transistor is in a conducting state when said contacts are in contact with each other.

4. The exposure control device claimed in claim 1 further comprising a spring coupled to said mask and biasing said mask toward the first position.

5. In a camera having a shutter release mechanism and an exposure control device, the exposure control device including a photoelectric cell adapted to be illuminated by scene light and electrically coupled to an electrical measuring instrument, the electrical measuring instrument including a coil of electrically conductive material having two end portions, the coil being energizable by a first source of electrical power of a predetermined polarity established in response to illumination of the photoelectric cell or by a second source of electrical power electrically couplable to the coil, a diaphragm vane having an elongate tapered aperture aligned with a light path of the camera, the vane being coupled to and movable in a predetermined direction by the instrument in response to energization of the coil by the first source of electrical power to variably position the vane aperture relative to the light path, and a pivotally mounted mask movable from a first position in alignment with the light path to a second position out of alignment with the light path, the improvement comprising:
   (a) an electrical circuit for energizing the coil to effect movement of the vane in a direction opposite to the predetermined direction, said circuit including
      (1) a first electrical contact,
      (2) a pair of terminals adapted to be electrically coupled to the second source of electrical power, one of said terminals being electrically coupled to one of the end portions of the coil, the other of said terminals being electrically coupled to said first contact,
      (3) a second electrical contact electrically coupled to the other of the end portions of the coil, said second contact being movable into and out of contact with said first contact to close and open, respectively, said circuit, energization of the coil in response to a predetermined intensity of the illumination of the photoelectric cell causing movement of said second contact into contact with said first contact, thereby closing said circuit and energizing the coil by the second source of electrical power, the second source of electrical power being coupled in said circuit with a polarity opposite to the predetermined polarity, the electrical power from the second source being greater than the electrical power from the first source when said circuit is closed, and
      (4) a switch actuatable for opening and closing said circuit independently of the illumination of the photoelectric cell;
   (b) means for coupling the vane to the mask to effect movement of the mask from the first position toward the second position in response to closing of said circuit; and
   (c) means for biasing the mask toward the first position.

6. The improvement claimed in claim 5 further comprising means for coupling said switch to the shutter release mechanism to actuate said switch in response to operation of the mechanism.

7. The improvement claimed in claim 5 wherein the instrument includes a member rotatable in relation to the intensity of the illumination of the photoelectric cell, and wherein said second contact is on said member.

8. The improvement claimed in claim 5 wherein the vane is coupled to the mask by a projection on the vane engageable with a projection on the mask.

9. The improvement claimed in claim 5 wherein the biasing means includes a spring coupling the mask to a spring support, and wherein the improvement further comprises a stop engageable by the mask when the mask is in the first position.

10. The improvement claimed in claim 5 wherein said circuit further includes a positive cut-off transistor having a base electrically coupled to said first contact and having an emitter and a collector electrically coupled to said other terminal and to the other end portion of the coil, respectively.

References Cited

UNITED STATES PATENTS

| 3,033,093 | 5/1962 | Stimson et al. |
| 3,072,035 | 1/1963 | Martin. |
| 3,292,517 | 12/1966 | Eagle et al. |

FOREIGN PATENTS

| 228,622 | 7/1963 | Austria. |
| 653,171 | 9/1964 | Belgium. |

NORTON ANSHER, Primary Examiner

J. F. PETERS, Jr., Assistant Examiner

U.S. Cl. X.R.

95—10